United States Patent [19]

Kobari et al.

[11] Patent Number: 4,824,364
[45] Date of Patent: Apr. 25, 1989

[54] NON-FERROUS METAL SMELTING FURNACE

[75] Inventors: Osamu Kobari; Takashi Kida, both of Chiba, Japan

[73] Assignee: Toho Development Engineering Co., Ltd., Tokyo, Japan

[21] Appl. No.: 107,648

[22] Filed: Oct. 9, 1987

[30] Foreign Application Priority Data

May 15, 1987 [JP] Japan ................. 62-118542

[51] Int. Cl.$^4$ ........................... F24H 7/00; C21B 9/00
[52] U.S. Cl. ..................................... 432/30; 432/156; 432/182
[58] Field of Search ............... 432/210, 156, 197, 182, 432/212, 58, 30; 266/156, 900, 145

[56] References Cited

U.S. PATENT DOCUMENTS

| | | | |
|---|---|---|---|
| 4,311,456 | 1/1982 | Kletch | 432/30 |
| 4,319,921 | 3/1982 | Pryor et al. | 266/156 |
| 4,582,485 | 4/1986 | White, Jr. | 432/30 |
| 4,614,496 | 9/1986 | Binglin et al. | 432/30 |
| 4,671,345 | 6/1987 | Masters et al. | 432/182 |
| 4,691,900 | 9/1987 | Maeda | 266/156 |

Primary Examiner—Henry C. Yuen
Attorney, Agent, or Firm—Martin A. Farber

[57] ABSTRACT

A non-ferrous metal smelting furnace including a preheating tower includes a smelting chamber, provided below the preheating tower, a combustion chamber, provided adjacent to the preheating tower, a lower portion of which communicates with the smelting chamber, the combustion chamber being provided with a burner for generating a combustion gas on its upper furnace body, and a gas diffusion mechanism, provided in the smelting chamber, and including retaining members for constituting a plurality of openings distributed between the smelting chamber and the preheating chamber in the preheating tower and for retaining a material in the preheating tower.

2 Claims, 2 Drawing Sheets

NON-FERROUS METAL SMELTING FURNACE

BACKGROUND OF THE INVENTION

The present invention relates to a non-ferrous metal smelting furnace used for smelting a non-ferrous metal such as aluminum and, more particularly, to a non-ferrous metal smelting furnace having a material preheating tower.

In recent years, a material is preheated and then used in smelting of a non-ferrous metal such as aluminum for the sake of energy saving. That is, a material preheating tower which also serves as a flue is provided to a smelting furnace, and a cold material in the heating tower is preheated by an exhaust gas which is already used in smelting. For example, in order to smelt a large amount of aluminum material, e.g., a scrap, a smelting furnace having a preheating tower as shown in FIG. 4 is used as an aluminum concentrated smelting furnace.

In FIG. 4, a reverberatory furnace type smelting furnace A constituted by refractory bricks includes a preheating tower B which is also constituted by refractory bricks at its upper side portion. The preheating tower B has a material charging port C and an exhaust port D at its upper portion and also serves as a material charging portion and a flue of the smelting furnace A. A lower portion of the preheating tower B constitutes a smelting chamber E, and a smelting burner F is provided at a side wall of the smelting chamber E. A molten metal retaining chamber G which causes the smelting chamber E to communicate with the lower portion includes a heat insulating burner H at its upper furnace body, and a molten metal discharging chamber J is provided adjacent to the molten metal retaining chamber G so as to communicate with the lower portion. Therefore, a material scrap charged from the material charging port C moves downward while being heated by an exhaust gas moving upward in the preheating tower B, and smelted by the smelting burner F at the smelting chamber E. The resultant molten metal is heat-insulated by the heat insulating burner H and retained in the molten metal retaining chamber G, and then discharged or pumped out from the molten metal discharging chamber J as needed.

In the smelting furnace A having the above arrangement, a material is smelted by a combustion flame of a high temperature of the smelting burner F in the smelting chamber, and an exhaust gas having its heat inertia is directly moved upward in the preheating tower B to preheat the material and then exhausted from the exhaust port D. However, upon smelting of the material, the material is smelted directly by a combustion flame of the smelting burner F, i.e., the material is smelted in an oxygen atmosphere. Therefore, when a material having a high oxidizing property and a wide surface area, such as an aluminum scrap, is used, an oxidizing rate is increased to significantly decrease the smelting yield of the material. In addition, since paths of an exhaust gas in the preheating tower B are not uniform, a specific portion is locally overheated to cause blow of a heating gas, resulting in a decrease in an effective heat transfer area of the material, significant heat energy loss such as a rapid decrease in heat recovery ratio, and an oxidation loss and evaporation loss of the metal caused by local overheating of the material, in the preheating tower B.

SUMMARY OF THE INVENTION

It is, therefore, a principal object of the present invention to provide a smelting furnace including a material preheating mechanism, which can smelt a material in a nonoxidizing atmosphere without heating the material directly by a combustion flame of a smelting burner and can prevent a drift of an exhaust gas flowing through the material preheating mechanism, thereby effectively utilizing a heat energy and improving the smelting yield of a material.

In order to achieve the above object of the present invention, there is provided a non-ferrous metal smelting furnace including a preheating tower, comprising a smelting chamber, provided below the preheating tower, a combustion chamber, provided adjacent to the preheating tower, a lower portion of which communicates with the smelting chamber, the combustion chamber being provided with a burner for generating a combustion gas on its upper furnace body, and a gas diffusion mechanism, provided in the smelting chamber, and including retaining members for constituting a plurality of openings distributed between the smelting chamber and the preheating chamber in the preheating tower and for retaining a material in the preheating tower.

DESCRIPTION OF THE PREFERRED EMBODIMENTS

A smelting furnace of the present invention will be described below with reference to FIGS. 1 and 2.

Figure 1:
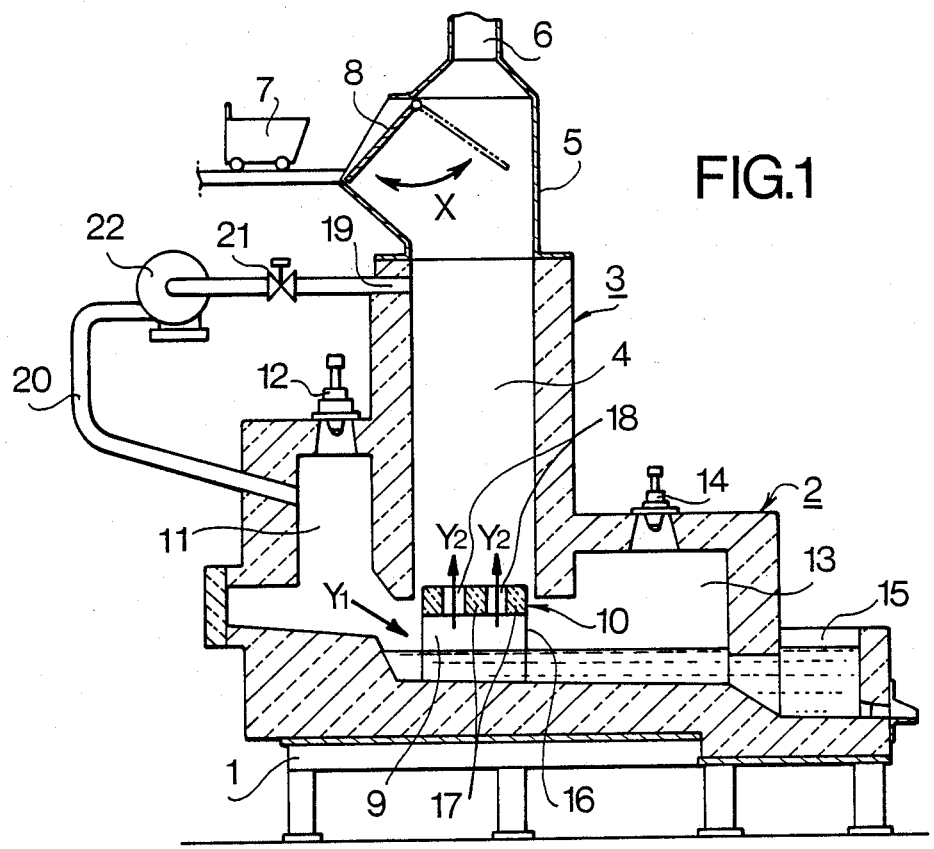
FIG. 1 is a longitudinal sectional view of a smelting furnace including a preheating tower according to an embodiment of the present invention.

In FIG. 1, a smelting furnace 2 constructed on a base floor 1 has a material preheating tower 3 which also serves as a flue at a substantially central portion of its furnace body. The preheating tower 3 has a hood 5 which also serves as a material inlet port at an upper portion of a preheating chamber 4, and an exhaust gas is exhausted to a duct 6 through the hood 5. A material is contained in a suitable container 7, lifted up toward the hood 5, and then charged into the preheating chamber 4 in synchronism with an opening operation (indicated by a double-headed arrow X in FIG. 1) of a hood door 8.

A smelting chamber 9 is provided below the preheating chamber 4 and includes a gas diffusion mechanism 10 to be described in detail later.

A combustion chamber 11 is provided adjacent to the preheating chamber 4, and a combustion burner 12 is mounted on an upper furnace body of the combustion chamber 11 to face downward. A molten metal retaining chamber 13 is provided adjacent to a side opposite to the combustion chamber 11 so as to sandwich the preheating chamber 4 and the smelting chamber 9, and a heat insulating burner 14 is mounted on an upper furnace body of the molten metal retaining chamber 13 to face downward. A molten metal discharging chamber 15, an upper portion of which is open, is provided adjacent to the molten metal retaining chamber 13. The combustion chamber 11, the smelting chamber 9, the molten metal retaining chamber 13, and the molten metal discharging chamber 15 communicate with each other through their lower portions.

Figure 2:
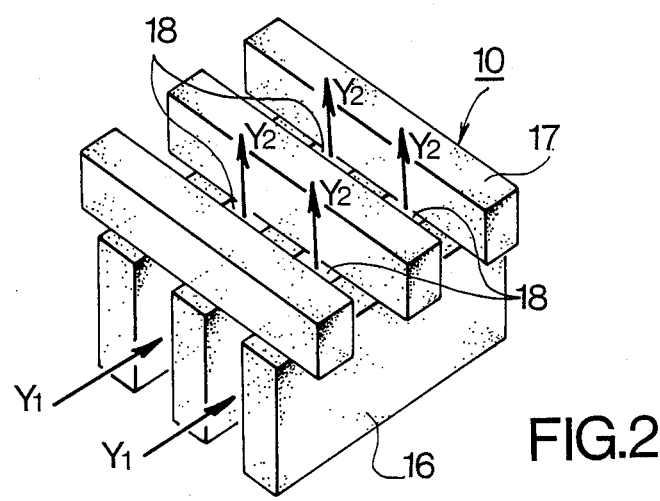
FIG. 2 is an enlarged perspective view of a gas diffusion mechanism incorporated in the smelting furnace shown in FIG. 1.

As shown in an enlarged perspective view of FIG. 2, the gas diffusion mechanism provided to the smelting chamber 9 has an arrangement obtained by stacking ceramic materials like a grating. That is, a plurality of walls 16, arranged to be separated from each other and parallel to a direction toward the molten metal retaining chamber 13, are fixed in the smelting chamber 9, and gaps therebetween constitute paths of a combustion gas and a molten metal. A plurality of elongated retaining members 17, each having a rectangular sectional shape, are placed on upper surfaces of the walls 16 to be separated from each other and orthogonal to a longitudinal direction of the walls 16 so as to close the lower portion of the preheating chamber 4. Each retaining member 17 placed on the walls 16 is held by a shelf portion (not shown) on a furnace wall and can be easily attached/detached through an inspection window (not shown) of the smelting furnace 2. With this arrangement, a plurality of openings 18 for a combustion gas are formed to be substantially uniformly distributed between the preheating chamber 4 and the smelting chamber 9 by the walls 16 and the retaining members 17, and a material aluminum scrap and the like in the preheating chamber 4 are retained. The walls 16 and the retaining members 17 are formed by a ceramic material having a heat resistance.

In addition, in the smelting furnace 2 of FIG. 1, a gas exhaust port 19 is formed in an upper side wall of the material preheating chamber 4, and an exhaust gas branch pipe 20 is mounted thereto and open at an upper portion in the combustion chamber 11 through a valve 21 and a fan 22.

The smelting furnace 2 according to the embodiment of the present invention has an arrangement as described above. In this arrangement, fuel is combustioned by the combustion burner 12 in the combustion chamber 11 to generate a high-temperature combustion gas, and the combustion gas reaches the smelting chamber 9 as indicated by arrows $Y_1$ in FIG. 2 and then flows into the preheating chamber 4 through openings 18 formed by a combination of the walls 16 and the retaining members 17 of the gas diffusion mechanism 10 as indicated by arrows $Y_2$. The aluminum material charged in the preheating chamber 4 is retained on the gas diffusion mechanism 10, brought into contact with the combustion gas and the gas diffusion mechanism 10 heated by the combustion gas to be smelted or half-smelted, and falls downward between the walls 16 to become a complete molten metal.

In this case, since the material aluminum is smelted not by an oxidizing flame but by a combustioned nonoxidizing heat gas, almost no oxidizing loss of the material occurs during smelting. The material smelting yield of about 99.5% or more can be obtained in the embodiment of the present invention while that obtained in a conventional normal aluminum smelting furnace is about 97 to 98%. The heat gas which smelts the aluminum material moves upward as an exhaust gas to preheat the material in the preheating chamber. In this case, if the heat gas exhibits a temperature of 850° to 1,000° C. in the smelting chamber 9, a temperature of the exhaust gas in the hood 5, which preheats the material charged in the preheating chamber 4, is 200° to 270° C. Therefore, it is found that heat energy is uniformly and effectively utilized to preheat the material.

Note that in the present invention, if part of the exhaust gas already used for preheating is circulated to the combustion chamber 11 through the gas exhaust port 19 at the upper portion of the preheating chamber 4 and the exhaust gas branch pipe 20, the temperature of the combustion gas is further stabilized, thereby advantageously stabilizing a state of the furnace and saving the heat energy. In this case, the heat gas temperature can be easily stabilized by a simple operation, i.e., by measuring an exhaust gas temperature of the hood 5 or the duct 6 and opening/closing the valve 21 of the exhaust gas branch pipe 20 in synchronism therewith.

Figure 3A:
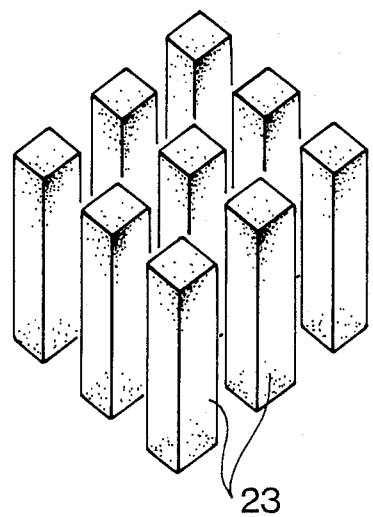
FIGS. 3A and 3B are perspective views of other embodiments, respectively, of the gas diffusion mechanism incorporated in the smelting furnace of the present invention.
Figure 3B:
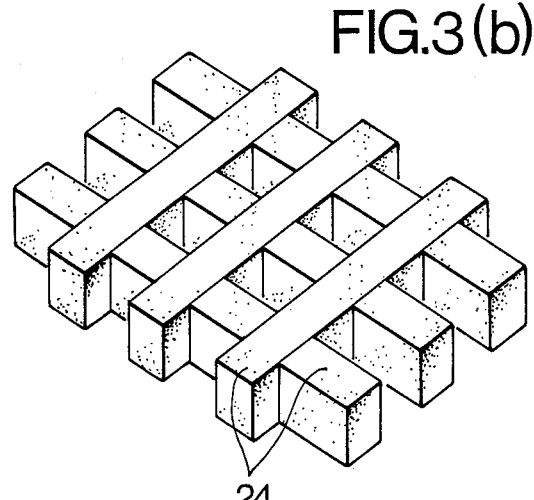
Figure 4:
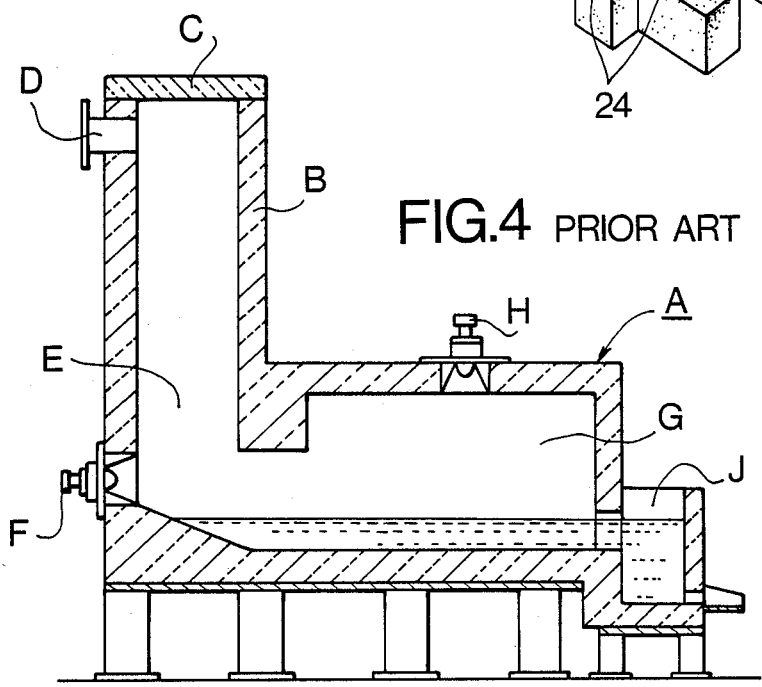
FIG. 4 is a longitudinal sectional view of a conventional smelting furnace including a preheating tower.

The gas diffusion mechanism of the present invention is not limited to the embodiment shown in FIG. 2, but may be other embodiments respectively shown in FIGS. 3A and 3B. FIG. 3 shows a gas diffusion mechanism obtained by arranging a plurality of square pillars 23, manufactured by a refractory material, upright in line as retaining members. A material is retained on upper surfaces of the square pillars 23, and gaps between the pillars serve as gas passages and molten metal flow paths. When the material is retained thereon, upper portions of the gaps between the pillars substantially form openings. Since paths are flexible, this gas diffusion mechanism can be used in a smelting furnace of a compact size in which a molten metal retaining chamber is arranged to form a hook shape together with a combustion chamber with a preheating tower sandwiched therebetween. The square pillar may be a column having a circular section. FIG. 3B shows a gas diffusion mechanism in which flexibility of molten metal flow paths is increased. In this mechanism, retaining members 24 combined like a grating are held by a shelf on a furnace wall and supported at lower portions thereof by pillars as needed.

The smelting furnace of the present invention can be used for both heavy oil and gas fuel. In addition, the present invention can be used as a concentrated smelting furnace which smelts a large amount of aluminum scrap and as a hand ladle used for drawing up a small amount of molten metal in a die casting factory.

As has been described above, according to the present invention, since a material is smelted not by an oxidizing combustion flame but by a heat gas generated in an additionally provided combustion chamber, almost no smelting loss of the material occurs. In addition, since a gas diffusion mechanism is provided to a smelting chamber below a preheating tower so as to eliminate a drift of a preheating gas flow, heat is effectively utilized. As a result, an oxidizing loss or an evaporation loss of the material caused by local overheating of the material at a preheating stage can be effectively prevented.

What is claimed is:
1. A non-ferrous metal smelting furnace comprising:
   a preheating tower provided at a substantially central portion of a body of the furnace and having a preheating chamber in which a material to be smelted is charged;
   a smelting chamber provided below said preheating chamber and communicating with a lower portion of said preheating chamber;
   a combustion chamber provided adjacent to said smelting chamber;

a burner mounted on an upper furnace of a body of said combustion chamber and generating a combustion gas on its upper furnace body;

a molten metal retaining chamber adjacent to a side of said smelting chamber opposite to said combustion chamber so as to sandwich said smelting chamber; and a gas diffusion unit mounted in said smelting chamber and having a grating arrangement comprising a stack of ceramic material, said stack of ceramic material being formed of a plurality of walls of the ceramic material arranged separated from each other and directed in parallel relation toward said molten metal retaining chamber, the stack including a plurality of elongated retaining members placed on upper surfaces of said walls and separated from each other and positioned orthogonally to a longitudinal direction of said walls, there being a plurality of openings defined by said walls and said retaining members substantially uniformly distributed between said preheating chamber and said smelting chamber.

2. A furnace according to claim 1, wherein an exhaust gas branch pipe is provided to circulate part of a material preheating exhaust gas from said preheating tower to said combustion chamber.

* * * * *